United States Patent Office 3,786,008
Patented Jan. 15, 1974

3,786,008
PRINTER'S INK
Eduard Karlovich Piiroya, ulitsa Syle 21, kv. 9, and Mall Felix-Ottomarovna Adrat, ulitsa Kunderi 10, kv. 6, both of Tallin, U.S.S.R.
No Drawing. Continuation-in-part of application Ser. No. 132,576, Apr. 4, 1971, which is a continuation of application Ser. No. 749,568, Aug. 2, 1968, both now abandoned. This application Aug. 18, 1971, Ser. No. 172,871
Int. Cl. C09d 3/66, 11/10
U.S. Cl. 260—23 H    9 Claims

ABSTRACT OF THE DISCLOSURE

A printing ink, comprising polyisobutylene with a molecular weight of 20,000–200,000; air-drying varnishes comprising polymerized linseed oil or a polyester of pentaerythritol and phthalic acid modified with drying vegetable oil and dissolved in this oil, or a polyester of glycerine and phthalic acid modified with drying vegetable oil and dissolved in this oil, or mixtures of the above-mentioned varnishes; metal salts of high carboxylic acids having more than 6 carbon atoms; pigments and an organic solvent.

---

This application is a continuation-in part of application Ser. No. 132,576, filed Apr. 4, 1971, and now abandoned which in turn was a continuation of application Ser. No. 749,568, filed Aug. 2, 1968 and now abandoned.

The present invention relates to printing ink to be used in printing on polymer materials, glass, regenerated cellulose, and the like, or in dying the above-mentioned materials.

Known in the art are printing inks on the basis of polyisobutylene, pigments and solvents.

Thus, known in the art is a printing ink consisting of oligomer polyisobutylene having a molecular weight of 1,000–12,000, air-drying varnish comprising polymerized linseed oil, pigments and organic solvents (cf. U.S. Pat. No. 2,154,089).

The prior art inks possess low adhesion to the surface of polyethylene resulting in low quality of printing on polyethylene or dying thereof.

In order to improve ink adhesion to polyethylene, the latter is activated prior to ink application by a gas flame, corona discharge or by treatment with solutions of various chemicals.

Preliminary treatment of the polyethylene surface involves, depending on the type of the treatment used, the employment of complicated equipment, consumption of various chemicals which results in an increase of the cost of the final product (polyethylene with an ink applied thereonto).

It is an object of the present invention to provide a printing ink having high adhesion to high pressure polyethylene, which eliminates preliminary treatment of the polyethylene surface prior to application of an ink thereonto.

In accordance with this and other objects the invention provides a printing ink comprising polyisobutylene with a molecular weight of 20,000–200,000; air-drying varnishes comprising polymerized linseed oil, or a polyester of pentaerythritol and phthalic acid modified with a drying vegetable oil and dissolved in this oil, or a polyester of glycerine and phthalic acid modified with a vegetable oil and dissolved in this oil, or mixtures of the above-mentioned varnishes; metal salts of high carboxylic acids having more than 6 carbon atoms; pigments and an organic solvent.

The printing ink according to the invention may comprise as the air-drying varnish a polyester of pentaerythritol and phthalic acid modified with linseed, tung or castor oil and dissolved in the same oil.

Said printing ink may also comprise as the varnish a polyester of glycerine and phthalic acid modified with linseed, tung or castor oil and dissolved in the same oil.

As the metal salts of high carboxalic acids, the printing ink may comprise e.g. resinates, linoleates, or naphthenates of calcium, manganese, lead, cobalt, and aluminum (both as individual salts and various mixtures thereof).

The ink according to the invention may comprise as the pigments, organic and inorganic pigments and mixtures thereof.

As the organic solvents, the ink according to the invention may comprise toluene, tetrahydronaphthalene, decahydronaphthalene, or butylacetate of turpentine oil.

In order to improve the sharpness of printing on a material, it is advantageous to use a filler such as aluminium hydroxide or a mixture of aluminium hydroxide and barium sulphate.

In a preferable embodiment of the printing ink, there is employed 100 parts by weight of polyisobutylene, 10–5,000 parts by weight of a varnish, 1–500 parts by weight of metal salts of high carboxylic acids, 5–500 parts by weight of pigments, 10–2,000 parts by weight of fillers and 1,000–4.000 parts by weight of a solvent.

When a filler is incorporated into the printing ink, it is advisable to use for 100 parts by weight of polyisobutylene, 10–5,000 parts by weight of a varnish, 1–500 parts by weight of metal salts of high carboxylic acids, 5–500 parts by weight of pigments, 10–2,000 parts by weight of fillers and 1,000–4,000 parts by weight of a solvent.

The ink according to the invention possesses high adhesion to the surface of high pressure polyethylene which manifests itself during a normal thermal drying of the ink at a temperature of 75°–100° C. upon application thereof onto the polyethylene surface. During the drying, softening of the polyethylene takes place with simultaneous diffusion of the ink thereinto. The intensity of the ink diffusion depends on the temperature and duration of drying, as well as on the quality of the polyethylene. The higher the temperature, the longer the duration of drying, and the greater the roughness of the polyethylene surface, the deeper the ink penetration into the polyethylene.

The printing ink according to the invention is prepared in the following manner:

Polyisobutylene is dissolved in an organic solvent such as toluene, tetrahydronaphthalene, decahydronaphthalene, butylacetate or turpentine oil. At the same time a pigment and a filler, if any, are ground by means of paint grinders. Prior to grinding, the pigment and filler are mixed with one or several of the above-mentioned varnishes, whereafter the grinding is performed to obtain a fineness of 5–10μ. To the mass thus produced is added the polyisobutylene solution and the metal salts of high carboxylic acids, and the resulting mixture is then thoroughly stirred.

Alternatively, the printing ink may be prepared using a ball or vibration mill. In this case all the components are charged into a mill (polyisobutylene, one or more varnishes, salts of high carboxylic acids, pigment and filler, if any) and the mass is ground to obtain a fineness of 5–10μ.

Prior to the use of the ink according to the invention for printing on polymer materials, glass, cellophane and the like or for dying the surface of said materials, it is necessary to dilute it with a solvent to obtain a desired viscosity. The latter depends on the method of printing and dying materials.

The printing ink according to the invention may be used in silk screen stencil printing, offset, intaglio and relief printing. The dying of the surface of the above-mentioned materials may be made by spraying or brushing technique.

Where the ink according to the invention is employed for printing on high pressure polyethylene and polypropylene or for dying thereof, a preliminary treatment of the surface of said materials is required (such as, for instance, treatment by gas flame, corona discharge, with solvents of various chemicals), in order to provide for high adhesion of the ink to said materials.

Upon printing on polymer materials (including printing on the activated surface of low pressure polyethylene or activated surface of polypropylene and except for high pressure polyethylene), glass, regenerated cellulose and the like, or upon dying the surface thereof, the ink is dried for 10–15 hours at room temperature or for about 10 minutes at a temperature of 50° C.–60° C.

The ink applied onto the untreated surface of high pressure polyethylene should be dried at 75° C.–100° C. for 15–45 minutes to obtain the required adhesion of the ink to polyethylene, the duration of drying depending on the drying temperature and the nature of the polyethylene articles being treated. Thus, upon printing on polyethylene film about 50 thick the ink should be dried at a temperature of 90°–95° C. for 15–20 minutes.

Upon printing on the surface of a 100 ml. polyethylene bottle having a wall thickness of 1 mm. the ink should be dried for 20–25 minutes at 90° C.–95° C.

In both cases, adhesion of the ink to the polyethylene surface is of about 300 g./cm.

The invention will be better understood upon reading the following examples of preparing the printing ink, given by way of illustrative only.

EXAMPLE 1

320 g. of a polyisobutylene solution (60 g. of low molecular polyisobutylene with a molecular weight of 20,000–85,000 in 260 g. of toluene), 310 g. of polyester of pentaerythritol and phthalic acid modified with linseed oil and dissolved in this oil, 35 g. of a mixture of resinates and linoleates of cobalt, manganese and lead, 185 g. of a filler (a mixture of aluminium hydroxide and barium sulphate), 150 g. of a yellow organic pigment and 80 g. of toluene were charged into a ball mill. The mixture was ground in a mill to obtain a fineness of 5–10μ.

The printing ink thus obtained possessed the following characteristics upon application thereof onto articles made of high pressure polyethylene.

An ink layer about 10μ thick applied onto a polyethylene film was completely dry within 10 hours at a temperature of 18° C.–20° C. and within 10 minutes at a temperature of 90° C.–95° C.

Adhesion of the ink with the layer thickness of 10μ to the polyethylene film upon drying at a temperature of 90° C.–95° C. for 10 minutes was 200 g./cm. and upon drying for 15–30 minutes —300 g./cm.

Adhesion of the ink with the layer thickness of 10μ to the surface of a 100 ml. polyethylene bottle having a wall thickness of 1 mm. upon drying at a temperature of 90° C.–95° C. for 10 minutes was 150 g./cm. and upon drying for 20–25 minutes —300 g./cm.

The dried ink was elastic, not subject to ageing when stored for a long time in the air and under the action of ultraviolet radiation. It withstood the action of water, alkalis, acids and organic solvents.

EXAMPLE 2

320 g. of a polymerized linseed oil of low degree of polymerization was mixed with 100 g. of a red organic pigment and 200 g. of aluminium hydroxide, and the mixture was ground in a paint grinder to obtain a fineness of 5–10μ. The mass thus obtained was mixed in a blender with 320 g. of a polyisobutylene solution (10 g. of high molecular polyisobutylene with a molecular weight of 180,000–200,000 in 310 g. of tetrahydronaphthalene), 35 g. of a mixture of resinates and linoleates of cobalt, manganese and lead and 100 g. of tetrahydronaphthalene. Mixing in the blender was performed until complete homogenization of the mass was obtained.

The printing ink thus produced possessed the following characteristics upon application thereof onto articles made of high density polyethylene.

An ink layer about 10μ thick applied to a polyethylene film was completely dry within 15 hours at a temperature of 18° C.–20° C. and within 10–12 minutes at a temperature of 90° C.–95° C.

Adhesion of the ink to polyethylene was similar to that obtained in Example 1.

The dried ink was elastic, not subject to ageing when stored for a long time in the air and under the action of ultraviolet radiation. It withstood the action of water, alkalis, acids and organic solvents.

EXAMPLE 3

320 g. of a polyisobutylene solution (5 g. of high molecular polyisobutylene with a molecular weight of 180,000–200,000 and 35 g. of low molecular polyisobutylene with a molecular weight of 20,000–85,000 in 280 g. toluene), 300 g. of polymerized linseed oil of a low degree of polymerization, 80 g. of polyester of glycerine and phthalic acid modified with tung oil and dissolved in this oil, 40 g. of a mixture of resinates and linoleates of cobalt, manganese and lead, 120 g. of a blue inorganic pigment and 100 g. of toluene were charged into a vibration mill.

The ink which was obtained was similar as to characteristics thereof to the ink prepared according to Example 2.

Although the invention has been described with reference to the preferred embodiment thereof it will be apparent to those skilled in the art that various modifications and variations may be made without departing from the spirit and scope of the invention as defined in the appended claims.

What is claimed is:

1. A printing ink which comprises per 100 parts polyisobutylene of a molecular weight of 20,000–200,000; 10–5,000 parts by weight air-drying varnishes selected from the group consisting of polymerized linseed oil, a polyester of pentaerythritol and phthalic acid modified with a drying vegetable oil and dissolved in this oil, and a polyester of glycerine and phthalic acid modified with a drying vegetable oil and dissolved in this oil; 1–500 parts by weight of metal salts of high carboxylic acids having more than 6 carbon atoms; 5–500 parts by weight of pigments and 1,000–4,000 parts by weight of an organic solvent, said printing ink being so constituted to have high adhesion with untreated non-absorbent polyolefin.

2. A printing ink according to claim 1, wherein the varnish polyester of pentaerythritol and phthalic acid is modified with a drying vegetable oil selected from the group consisting of linseed, tung and castor oil.

3. A printing ink according to claim 1, wherein the varnish polyester of glycerine and phthalic acid is modified with a drying vegetable oil selected from the group consisting of linseed, tung and castor oil.

4. A printing ink according to claim 1 wherein the metal salt is selected from the group consisting of resinates, linoleates, and naphthenates of calcium, manganese, lead, cobalt, and aluminum.

5. A printing ink according to claim 1, wherein said pigments comprise organic pigments.

6. A printing ink according to claim 1, wherein said pigments comprise inorganic pigments.

7. A printing ink according to claim 1, wherein said pigments comprise a mixture of organic and inorganic pigments.

8. A printing ink according to claim 1, wherein the solvent comprises a member selected from the group consisting of toluene, tetrahydronaphthalene, decahydronaphthalene, butylacetate and turpentine oil.

9. A printing ink which comprises per 100 parts of polyisobutylene with a molecular weight of 20,000–200,000; 10–5,000 parts by weight air-drying varnishes selected from the group consisting of polymerized linseed oil, a polyester of pentaerythritol and phthalic acid, modified with a drying vegetable oil and dissolved in this oil, and a polyester of glycerine and phthalic acid modified with a drying vegetable oil and dissolved in this oil; 1–500 parts by weight of metal salts of high carboxylic acids having more than 6 carbon atoms; 5–500 parts by weight of pigments; 10–2,000 parts by weight of fillers selected from the group consisting of aluminium hydroxide and a mixture of aluminium hydroxide and barium sulphate; and 1,000–4,000 parts by weight of an organic solvent, said printing ink being so constituted to have high adhesion with untreated non-absorbent polyolefin.

References Cited

UNITED STATES PATENTS

| | | | |
|---|---|---|---|
| 2,154,089 | 4/1939 | Hillman | 260—23 |
| 2,204,167 | 6/1940 | Gaylor | 260—32 |
| 2,265,639 | 12/1941 | Forman | 260—734 |
| 2,281,940 | 5/1942 | Lewis | 260—17 |
| 2,590,654 | 3/1952 | Schmutzler | 260—22 |
| 2,639,998 | 5/1953 | Pavlic | 117—38 |
| 2,640,782 | 6/1953 | Bloch et al. | 106—28 |
| 2,950,988 | 8/1960 | Deacon et al. | 117—38 |
| 3,035,933 | 5/1962 | Warner | 117—15 |
| 3,160,514 | 12/1964 | Wheelock | 117—38 |
| 3,245,825 | 4/1966 | Fessler et al. | 106—32 |

FOREIGN PATENTS

| | | | |
|---|---|---|---|
| 706,302 | 3/1965 | Canada | 106—32 |

DONALD E. CZAJA, Primary Examiner

R. W. GRIFFIN, Assistant Examiner

U.S. Cl. X.R.

106—28, 32; 117—138.8 E, 161 K, 161 UF; 260—22 CB, 23 P, DIG. 38